US009927253B2

(12) United States Patent
Clynne et al.

(10) Patent No.: US 9,927,253 B2
(45) Date of Patent: Mar. 27, 2018

(54) SYSTEM AND STEREOSCOPIC RANGE DETERMINATION METHOD FOR A ROADWAY LIGHTING SYSTEM

(71) Applicant: GE Lighting Solutions, LLC, East Cleveland, OH (US)

(72) Inventors: Thomas Clynne, East Cleveland, OH (US); Rick Dean Dureiko, East Cleveland, OH (US); Jonathan Robert Meyer, Shaker Heights, OH (US); Koushik Babi Saha, Strongsville, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 15/152,227

(22) Filed: May 11, 2016

(65) Prior Publication Data

US 2017/0328731 A1 Nov. 16, 2017

(51) Int. Cl.
| G06K 9/00 | (2006.01) |
| G01C 21/36 | (2006.01) |
| G08G 1/16 | (2006.01) |
| G08G 1/14 | (2006.01) |
| G06T 7/593 | (2017.01) |

(52) U.S. Cl.
CPC .......... *G01C 21/3647* (2013.01); *G06T 7/593* (2017.01); *G08G 1/14* (2013.01); *G08G 1/168* (2013.01); *G06T 2207/10021* (2013.01); *G06T 2207/10028* (2013.01); *G06T 2207/30264* (2013.01)

(58) Field of Classification Search
CPC .............................. G06Q 10/02; G06Q 50/30
USPC ......................................................... 382/106
See application file for complete search history.

(56) References Cited

U.S. PATENT DOCUMENTS

| 5,757,286 | A | * | 5/1998 | Jonsson | ................. | G01C 11/02 |
| | | | | | | 340/928 |
| 6,285,297 | B1 | * | 9/2001 | Ball | ........................ | G08G 1/14 |
| | | | | | | 340/932.2 |
| 2005/0002544 | A1 | * | 1/2005 | Winter | ...................... | G08G 1/14 |
| | | | | | | 382/104 |
| 2013/0266188 | A1 | * | 10/2013 | Bulan | ................. | G06K 9/00771 |
| | | | | | | 382/104 |

* cited by examiner

*Primary Examiner* — Tom Y Lu
(74) *Attorney, Agent, or Firm* — Peter T. DiMauro; GE Global Patent Operation

(57) ABSTRACT

Provided is a system that includes a first camera and a second camera each configured to capture image data from respective viewing angles, and a data processor coupled with the first camera and the second camera, that receives the image data, calculates a range based on the image data received and validates the calculated range for a parking space.

10 Claims, 4 Drawing Sheets

SYSTEM AND STEREOSCOPIC RANGE DETERMINATION METHOD FOR A ROADWAY LIGHTING SYSTEM

TECHNICAL FIELD

The present invention relates generally to roadway lighting systems. In particular, the present invention relates to performing stereoscopic range determination in a system.

BACKGROUND

Conventional parking space detection systems employ parking sensors within parking spaces based, for example, on the radio frequency identification (RFID) technology. Alternatively, a camera can be employed to capture a single image of the parking space, or image of the parking lot, to locate or determine occupancy of individual parking spaces. Also, camera sensors are sometimes used at parking lot entryways to perform trip-wire type detection to sense vehicle presence and motion.

The accuracy, however, of these conventional detection systems can be compromised due to weather, poor lighting, or other objects within the parking spaces. Further, the installation of these conventional detection systems can be costly and time-consuming.

SUMMARY OF THE INVENTION

Embodiments of the present invention provide a system and a stereoscopic range determination method for detecting occupancy of a parking space.

In certain circumstances, an embodiment of the present invention includes a system having a first camera and a second camera. Each camera is configured to capture image data from respective viewing angles. The system also includes a data processor coupled with the first camera and the second camera. The data processor receives the image data, calculates a range based on the image data received and determines whether the range is a valid range for a parking space.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

Figure 1:
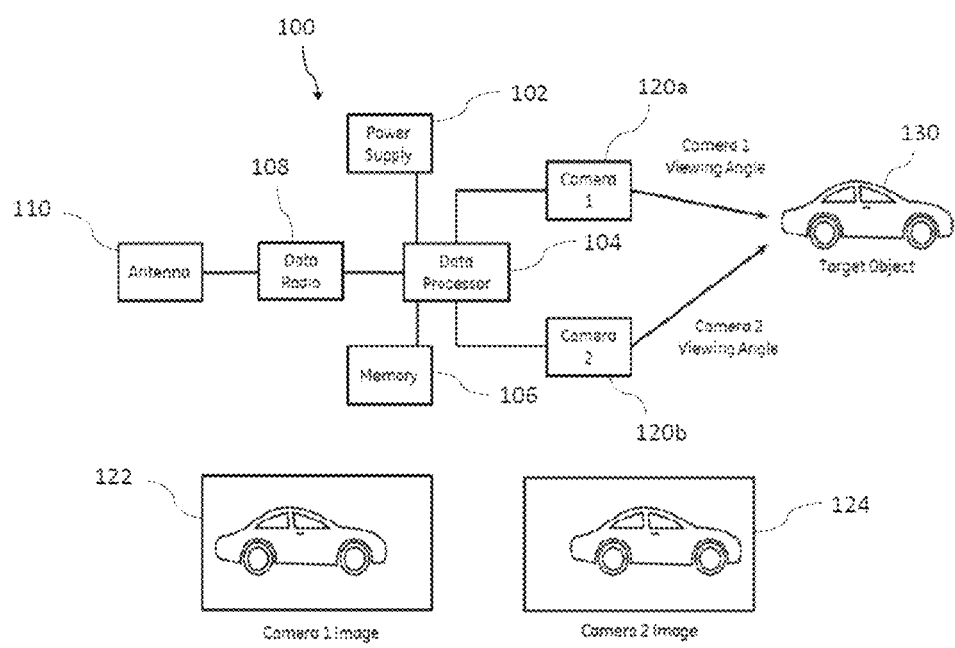
FIG. 1 is a block diagram illustrating a system that can be implemented within one or more embodiments of the present invention.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

DETAILED DESCRIPTION

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components.

In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 2:
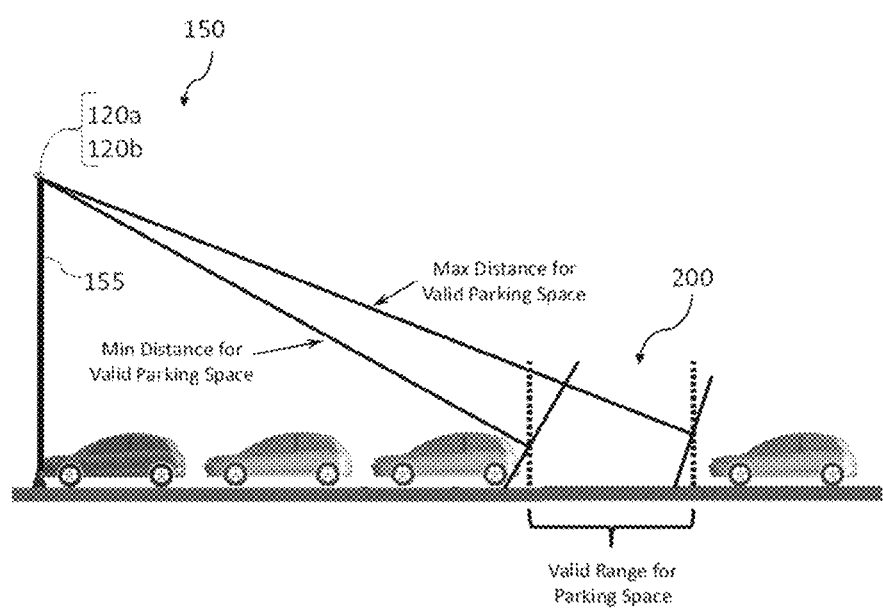
FIG. 2 is a schematic illustrating an implementation of the system of FIG. 1 within a roadway lighting system that can be implemented within one or more embodiments of the present invention.

Details regarding the system 100 of the present invention will now be discussed with reference to FIG. 1. FIG. 1 illustrates the system 100 which can be implemented within a roadway lighting system 150 (as depicted in FIG. 2). The present invention is not limited to implementation within roadway lighting systems and can be implemented within other systems.

As shown in FIG. 1, the system 100 includes a power supply 102, a data processor 104, and a memory 106. The system 100 also includes a data communication unit 108 (e.g., a data radio unit), at least one antenna 110 and a plurality of cameras (cameras 1 and 2) 120a and 120b.

The power supply 102 can be a separate power supply or integrated within the power supply of the roadway lighting system. The power supply 102 can be solar-powered. The power supply 102 supplies power to the components of the system 100.

The data processor 104 can include a computer or server. The data processor 104 can include an analog or digital processor.

The memory 106 can include hardware or storage media to store data and/or instructions for operating the cameras 120a and 120b. By way of example, the data includes parking facility information, image data, historical data or other suitable information. The instructions include software programming that can be executed by the data processor 104 to perform a technique for determining parking space occupancy.

The data communication unit 108 can perform wired or wireless communication. The wired communication can include a local area network (LAN) or wide area network (WAN), or directed optical connection or electrical connection. The wireless communication can be radiofrequency (RF) communication, cellular or Bluetooth type communication. Operations of the data communication unit 108 are performed using the antenna 110.

The system 100 is configured for communicating with other external systems or components of the roadway lighting system 150. For example, the system 100 can communicate with a metering system to provide timing information associated with the length of time a parking space has been occupied for purposes of billing or ticketing.

The cameras 120a and 120b are mounted to a pole 155 (as depicted in FIG. 2) or other fixed object of the roadway lighting system 150. The cameras 120a and 120b are mounted in a fixed position to each capture images 122 and 124 from a respective viewing angle, of a target 130. As an example, the target 130 can be a parking space, a car, or some other object or person within the parking space. In particular, the images 122 and 124 can be used to gather other occupancy data (e.g., vehicle license plate information, occupancy time information) associated with the target 130 within a parking space. The cameras 120a and 120b can also be used to capture other data such as traffic data, weather data and crosswalk usage data.

In FIG. 2, the system 100 performs a ranging technique, such as stereoscopic range determination, to determine occupancy of a parking space. The plurality of cameras 120a and 120b independently capture images 122 and 124 (as depicted in FIG. 1) respectively, of the parking space 200. The system 100 performs the range determination using the camera 120a and 120b, as each camera can be utilized to determine the range to a given target 130 (e.g., the parking space 200), with slightly different perspectives as accorded by their respective camera-to-camera spacing.

The ranging methodology (e.g., stereoscopic range determination) is based on a baseline distance between cameras 120a and 120b (as further discussed below regarding FIG. 3). The ranging methodology is also a function of the distance to the target 130, the field of view (FOV) of the lens of the cameras 120a and 120b and the resolution of the camera sensor as measured by its Instantaneous Field of View (IFOV) which is calculated by dividing the total Field of View by the number of pixels in that direction. The cameras 120a and 120b capture images 122 and 124 and are used to calculate the minimum distance to the parking space and a maximum distance to the parking space, respectively (as indicated by the arrows) to determine the range. Calculating distances using the stereoscopic range finding method will cause an increase in increments of measurement as the distance to the target 130 increases, and as the distance to the target 130 decreases, the increment of measurement decreases.

According to one or more embodiments, the cameras 120a and 120b can be mounted such that the optical axes of their lenses are parallel to each other which will generate a desired parallax shift or the perspective difference between the cameras 120a and 120b as discussed above. The perspective difference between the two cameras 120a and 120b forms the basis for the equation below used to determine the range to the target 130. The system 100 is effectively measuring the difference between the relative angle views of the cameras 120a and 120b to the target 130 as represented by the two different images 122 and 124.

The calculation of the pixel shift for the target 130 found in the images 122 and 124 can be used to determine the range to that target 130. In some cases, the optical axes of the lenses of the cameras 120a and 120b may not be parallel to each other, such that there can be a minimal amount of parallax error between the cameras 120a and 120b which is accommodated by the method as discussed below with reference to FIG. 4.

The image data, associated with the captured images 122 and 124, is transmitted from the cameras 120a and 120b to the data processor 104 for processing. The data processor 104 calibrates the range data received to determine if the range is valid (e.g., 25 feet) for a parking space 200 in order to determine occupancy by a car, or whether a person or object occupies the parking space 200. According to embodiments of the present invention, the range will be less than 80 feet.

The calibration operation further includes calculating offsets in both vertical and horizontal directions versus the target and storing this information in memory 106 for further use in determining the range to the target 130. It should be noted that although the description involves the detection of an empty parking space according to some embodiments, the present invention can also detect an occupancy of the parking space. Further details regarding the range determination is discussed below with reference to FIG. 3.

Figure 3:
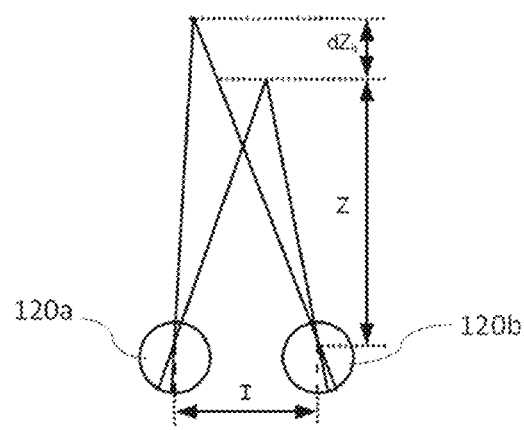
FIG. 3 is a schematic illustrating a position of a plurality of cameras of the system of FIG. 1 that can be implemented within one or more embodiments.

As shown in FIG. 3, range validation can be determined as a function of several variables. For example, (I) is the distance between the cameras 120a and 120b, ($dZ_h$) is the depth resolution between the images captured by the cameras 120a and 120b, (Z) is the range of the target 130 and ($\Delta T$) is the Instantaneous Field of View (IFOV) of the lens for each camera 120a and 120b. The relationship between these variables can be expressed in the equation:

$$dZ_h = \frac{Z^2 \Delta T}{I}$$

In the embodiments, and by way of example, the cameras 120a and 120b can be spaced apart a predetermined distance (I) of 5 to 20 inches. The depth resolution ($dZ_h$) can be approximately ±1.5 feet for cameras 120a and/or 120b having a megapixel count of 1.2 and a lens with approximately 80 degree Horizontal Field of View (HFOV). The cameras 120a and 120b are not limited to any particular depth resolution, megapixel count or IFOV, and can therefore vary accordingly.

Figure 4:
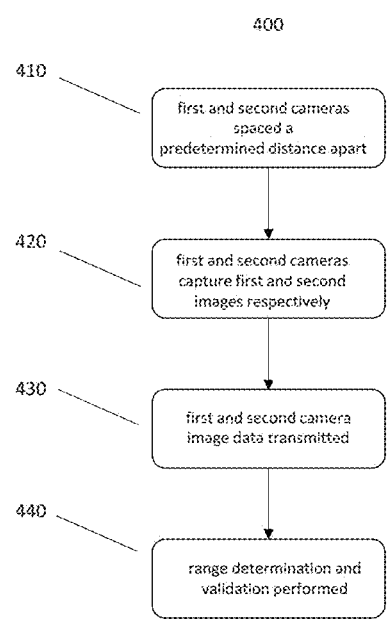
FIG. 4 is a flow chart illustrating a stereoscopic range determination method that can be implemented within one or more other embodiments of the present invention.

FIG. 4 is a flow chart illustrating a stereoscopic range determination method 400 according to one or more embodiments of the present invention. As shown in FIG. 4, the method 400 begins at operation 410 where a first camera and a second camera are disposed a predetermined distance apart in a fixed position (e.g., on a pole). From operation 410, the process continues to operation 420 where the first camera captures a first image and the second camera captures a second image.

In FIG. 4, the first image represents a minimum distance to a parking space and the second image represents a maximum distance to the parking space. From operation 420, the process continues to operation 430 where the image data from the first camera and the second camera is transmitted to a data processor for processing. From operation 430, the process continues to operation 440 where the processor determines a range using the minimum distance and the maximum distance obtained by the first and second cameras as shown in FIGS. 2 and 3, and determines whether the range is a valid range for a parking space.

According to other embodiments, the method 400 can employ a pattern matching algorithm to initially and periodically calculate the parallax offset between the two cameras. In the event of platform or pole movement from wind and other vibration excitations, there may be differences in the appearance between the two cameras if so, instantaneous re-calculation using the pattern matching algorithm can increase accuracy.

Embodiments of the present invention provide the advantages of determining parking space occupancy using a valid range without having to view the parking space itself, thereby eliminating errors in determining occupancy.

This written description uses examples to disclose the invention including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a first camera and a second camera each configured to capture image data from respective viewing angles; and
   a processor electrically coupled to the first camera and the second camera, and configured to: (i) receive the image data, (ii) calculate a range based on the image data received, and (iii) validate the calculated range, wherein the validating is performed in accordance with a stereoscopic range validation operation, and wherein the image data captured by the first camera includes a maximum distance of the range and the image data captured by the second camera includes a minimum distance of the range.

2. The system of claim 1, wherein the first camera and the second camera are disposed a predetermined distance apart; and
   wherein the validated range is associated with a parking space.

3. The system of claim 2, further comprising:
   a power supply configured to supply power;
   a data communication unit coupled with the processor and configured to perform communication via an antenna; and
   a memory configured to store the image data from the first camera and the second camera.

4. The system of claim 1, wherein the range validation operation is a function of variables (I), wherein (I) is the predetermined distance between the first camera and the second camera,
   ($dZ_n$) is a depth resolution between the images captured by the first camera and the second camera,
   (Z) is the range, and
   ($\Delta T$) is a horizontal instantaneous field of view (HIFOV) of a lens for each of the first camera and the second camera.

5. The system of claim 4, wherein a relationship between the variables is expressed in the equation:

$$dZ_n = \frac{Z^2 \Delta T}{I}.$$

6. The system of claim 2, wherein the predetermined distance ranges from approximately 5 inches to 20 inches.

7. The system of claim 3, wherein the data communication is wirelessly performed.

8. A method for performing range determination, the method comprising:
   disposing a first camera and a second camera a predetermined distance apart within a roadway lighting system;
   capturing image data from respective viewing angles using the first camera and the second camera; and
   receiving, at a data processor, the image data;
   calculating a range based on the image data; and
   validating the calculated range for a parking space, wherein the validating is performed in accordance with a stereoscopic range validation operation, and wherein the image data captured by the first camera includes a maximum distance of the range and the image data captured by the second camera includes a minimum distance of the range.

9. The method of claim 8, wherein the stereoscopic range validation operation is performed as a function of variables (I), wherein (I) is the predetermined distance between the first camera and the second camera,
   ($dZ_n$) is a depth resolution between the images captured by the first camera and the second camera,
   (Z) is the range, and
   ($\Delta T$) is a horizontal instantaneous field of view (HIFOV) of a lens for each of the first camera and the second camera.

10. The method of claim 9, wherein a relationship between the variables is expressed in the equation:

$$dZ_n = \frac{Z^2 \Delta T}{I}.$$

* * * * *